United States Patent

[11] 3,544,093

| [72] | Inventors | Robert K. Fisher<br>Grosse Ile;<br>George W. Plant, Wyandotte; Maurice J. Collins, Detroit, Michigan |
|---|---|---|
| [21] | Appl. No. | 773,614 |
| [22] | Filed | Nov. 5, 1968 |
| [45] | Patented | Dec. 1, 1970 |
| [73] | Assignee | Wyandotte Chemicals Corporation<br>Wyondotte, Michigan<br>a corporation of Michigan |

[54] CALCINING LIMESTONE
13 Claims, 1 Drawing Fig.

[52] U.S. Cl. .................................................. 263/53, 263/29
[51] Int. Cl. ..................................................... C04b 1/00
[50] Field of Search ............................................ 263/29, 53

[56] References Cited
UNITED STATES PATENTS

| 1,627,215 | 5/1927 | Truesdell ..................... | 263/53X |
| 1,832,552 | 11/1931 | Haslam ......................... | 263/29 |
| 3,142,480 | 7/1964 | Azbe ............................. | 263/29 |

Primary Examiner—John J. Camby
Attorneys—Bernhard R. Swick, Cedric H. Kuhn, Robert E. Dunn, Joseph D. Michaels and Charles G. Lamb

ABSTRACT: The process of calcining limestone in a vertical mixed feed-type kiln wherein gaseous fuel is mixed with the combustion air for such kiln at a concentration below the flammable limit for the fuel gas at the conditions at which the air-gas mixture enters the kiln. The combustion air then carries the gas up into the kiln burning zone whereby the gas is ignited by the heat from the burning coke and/or hot kiln charge.

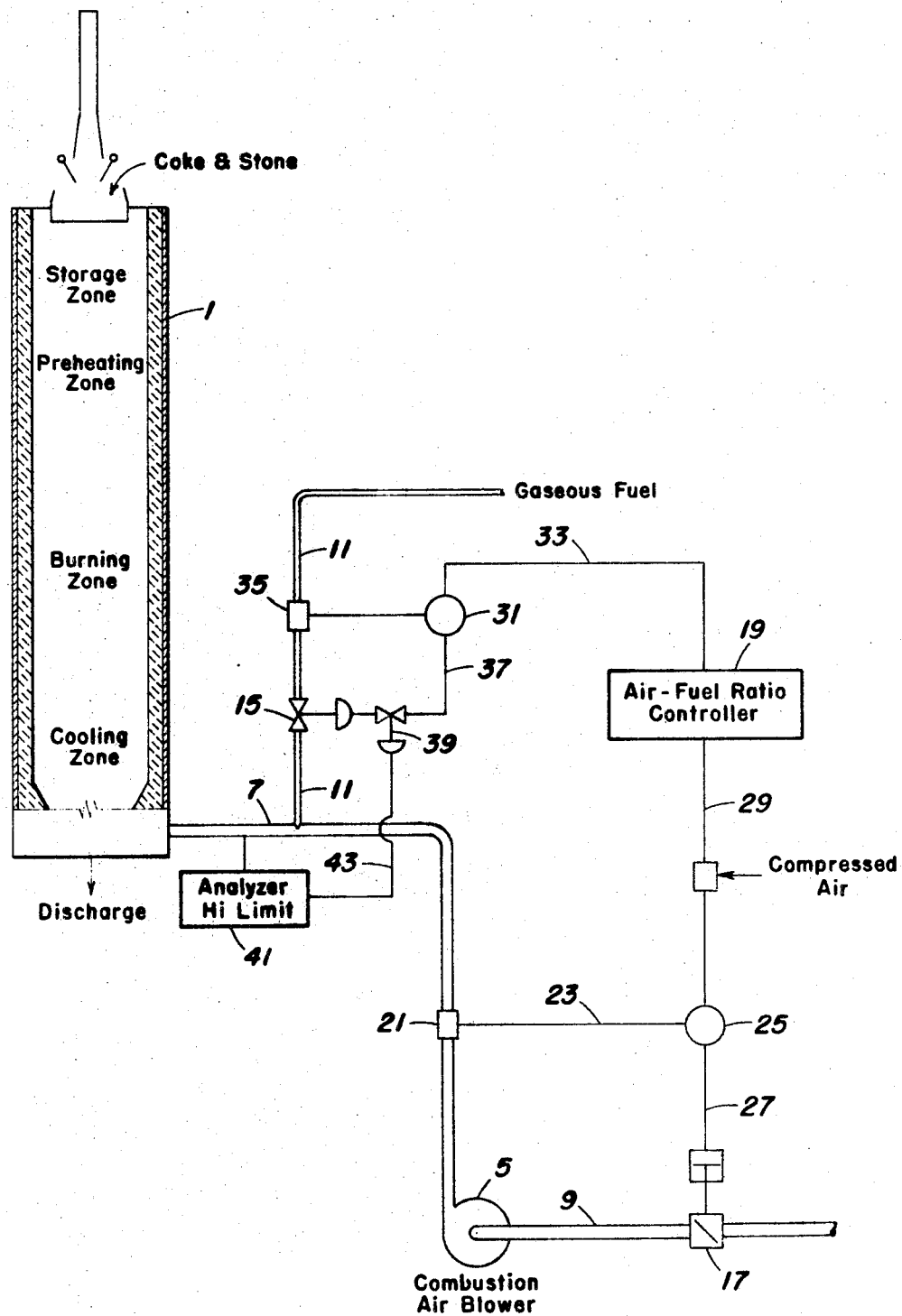

CALCINING LIMESTONE

At present there are three different types of kilns used for calcining material such as limestone. These are the gas fired vertical kiln, the mixed feed vertical kiln, and the rotary kiln. The mixed feed-type of kiln has an advantage over the gas fired or rotary kilns due to its principal attribute of low fuel consumption. All modern vertical kilns are divided into four distinct zones by imaginary horizontal planes. From top to bottom in sequence they are:

1. stone storage zone, a vertical or often a modified hopper-shaped zone;
2. preheating zone, a zone designed to heat the stone near dissociation temperatures;
3. calcining zone where combustion occurs; and
4. cooling or discharge zone, usually shaped like an inverted truncated cone at the bottom of which the lime is discharged.

A discussion of conventional vertical kilns is found in Chemistry and Technology of Lime and Limestone by Robert S. Boynton, Interscience Publishers, Division of John Wiley & Sons, New York, London and Sydney, Copyright 1966, pages 206—226. In a mixed feed kiln a dense metallurgical grade of coke of low reactivity or anthracite coal, both of which are low in ash and volatiles, are mixed intimately with limestone at a predetermined proportion, the fuel and stone being of comparable size and degradation. This admixture is added at the top of the kiln and descends gradually to the bottom of the kiln through the four zones mentioned above whereby the limestone is calcined into lime which is withdrawn from the bottom of the furnace. In such conventional kilns, combustion air is forced directly into the bottom of the kiln and flows upward through the furnace to support combustion of the coke for the burning or calcining of the limestone.

It is known in the prior art to burn limestone in a vertical kiln using fluid fuels which are injected through nozzles at one or more intermediate points in the length of the vertical kiln. Such fuels have been employed in lieu of the mixed feed of coke and limestone wherein only limestone is fed and also have been employed to supplement the mixed feed operation of coke and limestone. However, in all such cases the fluid fuel was injected through a burner nozzle at some intermediate point or points of the kiln.

These latter practices have certain inherent disadvantages, such as low thermal efficiency due to high temperatures and hot gases produced, necessity for an expensive kiln design or complex burner mechanism or both, and production of a very hot concentrated flame which often causes localized hotspots and unevenly calcined kiln discharge.

Accordingly, it is a purpose of this invention to provide an improved process for calcining limestone in a vertical mixed feed-type kiln wherein combustion air is forced into the bottom of the kiln characterized by increased thermal efficiency, a more evenly calcined kiln discharge, and wherein an expensive kiln design or complex burner mechanism is not required.

This and other purposes of the instant invention are accomplished by mixing a suitable gaseous fuel with the combustion air of a vertical mixed feed-type kiln at concentration below the flammable limit for the gaseous fuel at the conditions at which the air-gas mixture enters the kiln. More specifically, the concentration of the gas is low enough that a self-propagating flame is not produced at the conditions of temperature and pressure at which the gas-air mixture enters the kiln. At very low concentrations of gaseous fuel in the mixture, the combustion air carries the gas up into the kiln burning zone so that gas is ignited by the burning coke and hot kiln charge. In such a case the reaction is substantially an oxidation reaction and no self-propagating gas flame is produced. If the gas is mixed into the air at a higher concentration, i.e., just below the flammable limit at the inlet condition, the gas-air mixture becomes flammable as it is heated during its progress up the kiln towards the burning zone producing a gas flame burning among the coke and kiln charge which burning in this case could properly be called combustion. However, in either case the concentration is below the flammable limit for the particular gas at the conditions of temperature and pressure at which the gas-air mixture enters the kiln. The maximum amount of gas to be mixed with the air to have a concentration below the flammable limit for the gas at the inlet conditions will vary from one gas to another. However, such maximum is one which may easily be determined by one skilled in the art.

In a preferred embodiment of this invention where the gaseous fuel is natural gas, the air-gaseous fuel mixture contains from about 1 to 4 percent by volume of the gaseous fuel. Additional gaseous fuels which may be employed are natural gas, manufactured gas, coke oven gas, carbon monoxide, blast furnace gas, oil gas, hydrogen, and liquefied petroleum gas. Where these gases are employed, the amount of gaseous fuel in the mixture may be easily determined by one skilled in the art.

In general, the combustion air is forced into the bottom of the kiln through the use of a conventional blower with the air entering the blower inlet at ambient temperature and pressure. The gaseous fuel may be injected into the combustion air stream on either the discharge side or the inlet side of the blower and conventional control apparatus, either pneumatic, electrical, or electronic, may be employed to provide the optimum amounts of gaseous fuel and air entering the kiln.

One preferred control arrangement is illustrated in the accompanying drawing which is a diagrammatic representation of a mixed feed-type of vertical lime kiln and a control system for controlling the supply of combustion air and gaseous fuel. The control system as illustrated is a pneumatic type control system, however, as previously stated, an electrical or electronic control system may also be employed.

In the drawing, a conventional mixed feed-type vertical kiln 1 is supplied with combustion air at the bottom thereof by a combustion air blower 5 through a conduit 7. The air to the suction of combustion air blower 5 is supplied through a conduit 9. All the above-described apparatus are conventional for a mixed feed-type of kiln.

In accordance with the instant invention, a gaseous fuel, such as natural gas, is injected or mixed with the combustion air through a conduit, such as conduit 11, which, as shown in the embodiment of the drawing, is connected to conduit 7. While the conduit 11 for the gaseous fuel is shown connected to the conduit 7 on the discharge side of the air blower 5, it may just as easily be connected to the conduit 9 on the suction side of the air blower and the decision as to where it should be connected could be made by anyone skilled in the art depending on limitations of space, arrangement of apparatus, etc.

The gaseous fuel is supplied from a source not shown through conduit 11 which is provided with a control valve 15. This control valve 15, in combination with a control damper 17 in conduit 9 and pneumatic control system to be described, controls the overall quantity and ratio of air to gaseous fuel which enters the bottom of the lime kiln 1. More specifically, the flow of gaseous fuel is under the control of airfuel ratio controller 19.

In operation a flow element 21 provided in conduit 7 senses the combustion air flow and sends a signal through the pneumatic conduit 23 to a control device 25 controlling the combustion air flow by means of control damper 17 through pneumatic conduit 27. The signal from flow element 21 also is sent to airfuel ratio controller 19 through pneumatic conduit 29. Airfuel ration controller 19 in turn controls the set point of a control device 31 through pneumatic conduit 33. A flow element 35 is provided in conduit 11 which senses the rate of flow of the gaseous fuel and sends a signal to the control device 31 which then controls the gaseous fuel flow by means of control valve 15 through pneumatic conduit 37 which is provided with an automatic cutoff valve 39.

An analyzer 41 which is connected to the conduit 7 between the junction of conduits 11 and 7 and the kiln measures the amount of gaseous fuel in the airfuel mixture flowing to the kiln 1 and is provided with a high limit mechanism which operates when the fuel-to-air ratio reaches the maximum at which the analyzer 41 is set. The analyzer 41 sends a signal through pneumatic conduit 43 to valve 39, closing off valve 39 whereby the control valve 15 is closed off until the fuel-to-air ratio drops to a valve safely below the maximum setting of the analyzer 41. As previously stated, the gaseous fuel may be added or mixed with the combustion air on the discharge side of the blower as shown or it may be mixed with the combustion air on the suction side of the blower and where this is the case the above-preferred control system may also be applied.

When fuel gas is continuously mixed with the combustion air and forced into the bottom of the kiln, the burning zone in the kiln has the tendency to move down toward the bottom of the kiln whereby the cooling zone may gradually disappear and the lime produced is discharged at the very high temperatures of the burning zone. Accordingly, in one embodiment of this invention instead of continuously mixing gaseous fuel with the combustion air the gaseous fuel may be mixed periodically or, in other words, cyclically with the combustion air. For example, the gas may be mixed with the air for a period of two hours and then turned off for a period of one hour, followed by a period of two hours on and a period of one hour off, etc. The actual duration of the cycle as well as the ratio between "on" time and "off" time would be dependent upon various conditions including the size and design of the kiln, the rate at which the combustion air flows, etc. Where a control system such as that shown in the drawing is employed, a simple conventional timing mechanism (not shown) may be incorporated in the airfuel ratio controller 19 to alternately open and close valve 15. By way of example the timer could alternately open valve 15 for a period of two hours and close it for a period of one hour.

In order to reduce fuel cost and provide further means of control of flammability and location of combustion, a gas which is substantially inert with respect to the materials present in the kiln may be mixed with said air-gaseous fuel mixture. In a preferred embodiment of this invention, the maximum amount of said inert gas is about 50 percent by volume. This may be accomplished by mixing the inert gas with the gaseous fuel in the fuel line, mixing it with the combustion air prior to addition of the gaseous fuel or it may be added after the air and gaseous fuel are mixed. For reasons of economy it is preferred to employ spent or exit gas from the kiln for this purpose.

It is to be distinctly understood that various changes and modifications can be made in the foregoing without departing from the spirit of the invention and scope of the appended claims.

We claim:

1. In a process for calcining limestone in a vertical mixed feed-type of kiln wherein combustion air is forced into the bottom of the kiln, the improvement comprising mixing gaseous fuel with said combustion air at a concentration below the flammable limit for said gaseous fuel at the conditions at which the air-gaseous fuel mixture enters the kiln, and introducing said air-gaseous fuel mixture only at the bottom of said kiln.

2. The process of claim 1 wherein the concentration of said gaseous fuel in said air-gaseuos fuel mixture is just below the flammable limit for such gaseous fuel at the conditions at which the air-gaseous fuel mixture enters the kiln.

3. The process of claim 1 wherein the concentration of said gaseous fuel in said air-gaseous fuel mixture is substantially below the flammable limit for said gaseous fuel at the conditions at which the air-gaseous fuel mixture enters the kiln.

4. The process of claim 1 wherein said gaseous fuel is natural gas and said air-gaseous fuel mixture contains from about 1 to 4 percent by volume of said gaseous fuel.

5 The process of claim 1 wherein a gas which is substantially inert with respect to the materials present in said kiln is mixed with said air-gaseous fuel mixture.

6. The process of claim 5 wherein said inert gas is mixed with said air-gaseous fuel mixture in amount up to about 50 percent by volume.

7. The process of claim 6 wherein said inert gas is exit gas from said kiln.

8. The process of claim 1 wherein said gaseous fuel is mixed with said combustion air periodically whereby combustion air free from said gaseous fuel is forced into said kiln for periods of time which alternate with periods of time wherein said air-gaseous fuel mixture is forced into said kiln.

9. The process of claim 8 wherein a gas which is substantially inert with respect to the materials present in said kiln is mixed with said air-gaseous fuel mixture.

10. The process of claim 9 wherein said inert gas is mixed with said air-gaseous fuel mixture in amount up to about 50 percent by volume.

11. In a process for calcining limestone in a vertical mixed feed-type of kiln wherein combustion air is forced into the bottom of the kiln, the improvement comprising periodically mixing gaseous fuel with said combustion air at a concentration below the flammable limit for said gaseous fuel at the conditions at which the air-gaseous fuel mixture enters the kiln such that combustion air free from said gaseous fuel is forced into said kiln for periods of time which alternate with periods of time wherein said air-gaseous fuel mixture is forced into said kiln.

12. The process of claim 11 wherein a gas which is substantially inert with respect to the materials present in said kiln is mixed with said air-gaseous fuel mixture.

13. The process of claim 12 wherein said inert gas is mixed with said air-gaseous fuel mixture in amount up to about 50 percent by volume.